(12) United States Patent
Kim et al.

(10) Patent No.: US 10,311,337 B1
(45) Date of Patent: Jun. 4, 2019

(54) METHOD AND DEVICE FOR PROVIDING INTEGRATED FEATURE MAP USING ENSEMBLE OF MULTIPLE OUTPUTS FROM CONVOLUTIONAL NEURAL NETWORK

(71) Applicant: Stradvision, Inc., Pohang, Gyeongbuk (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/121,031

(22) Filed: Sep. 4, 2018

(51) Int. Cl.
*G06K 9/62* (2006.01)
*G06N 3/08* (2006.01)
*G06N 3/04* (2006.01)

(52) U.S. Cl.
CPC ......... *G06K 9/6262* (2013.01); *G06K 9/6256* (2013.01); *G06N 3/04* (2013.01); *G06N 3/08* (2013.01)

(58) Field of Classification Search
CPC ...... G06K 9/6262; G06K 9/6256; G06N 3/04; G06N 3/08
See application file for complete search history.

(56) References Cited

U.S. PATENT DOCUMENTS

2017/0372174 A1* 12/2017 Wshah ................ G06K 9/6256
2018/0018553 A1* 1/2018 Bach ................... G06F 17/2765
(Continued)

FOREIGN PATENT DOCUMENTS

| CN | 106339753 | * | 8/2016 |
| WO | WO2017/106998 | * | 6/2017 |

OTHER PUBLICATIONS

Machine translation for CN106339753 (Year: 2016).*
(Continued)

*Primary Examiner* — Qian Yang
(74) *Attorney, Agent, or Firm* — Xsensus, LLP

(57) ABSTRACT

A method for providing an integrated feature map by using an ensemble of a plurality of outputs from a convolutional neural network (CNN) is provided. The method includes steps of: a CNN device (a) receiving an input image and applying a plurality of modification functions to the input image to thereby generate a plurality of modified input images; (b) applying convolution operations to each of the modified input images to thereby obtain each of modified feature maps corresponding to each of the modified input images; (c) applying each of reverse transform functions, corresponding to each of the modification functions, to each of the corresponding modified feature maps, to thereby generate each of reverse transform feature maps corresponding to each of the modified feature maps; and (d) integrating at least part of the reverse transform feature maps to thereby obtain an integrated feature map.

26 Claims, 7 Drawing Sheets

(56) References Cited

U.S. PATENT DOCUMENTS

2018/0144447 A1\* 5/2018 Tate ................. G06T 5/003
2018/0268250 A1\* 9/2018 Drozdova ............ G06K 9/6215

OTHER PUBLICATIONS

Defferrard et al. "Convolutional Neural Networks on Graphs with Fast Localized Spectral Filtering", 30th Conference on Neural Information Processing Systems (NIPS 2016) (Year: 2016).\*

Kayahbay et al. "CNN-based Segmentation of Medical Imaging Data", arXiv:1701.03056v2 [cs.CV] Jul. 25, 2017 (Year: 2017).\*

\* cited by examiner

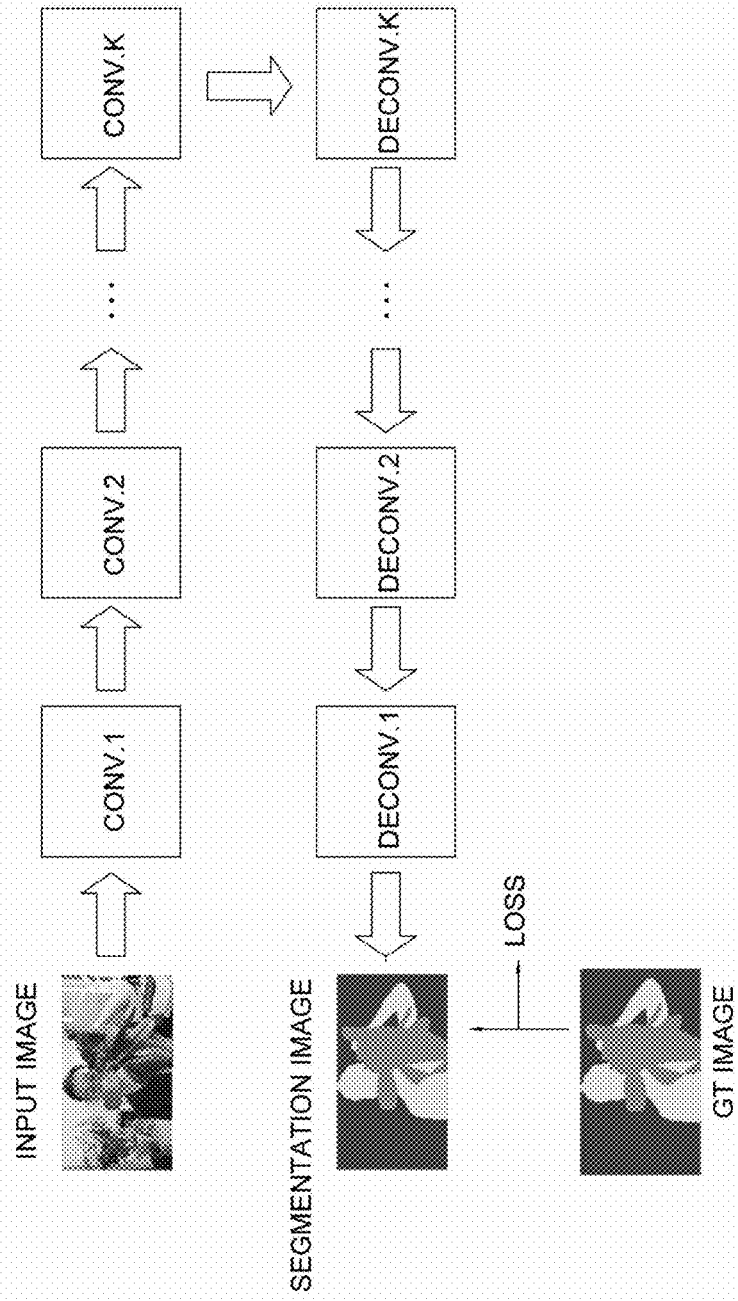

METHOD AND DEVICE FOR PROVIDING INTEGRATED FEATURE MAP USING ENSEMBLE OF MULTIPLE OUTPUTS FROM CONVOLUTIONAL NEURAL NETWORK

FIELD OF THE INVENTION

The present invention relates to a method for providing an integrated feature map using an ensemble of multiple outputs from a convolutional neural network; and more particularly, to the method for providing the integrated feature map by using an ensemble of a plurality of outputs from the convolutional neural network (CNN), including steps of: (a) a CNN device receiving an input image and applying a plurality of modification functions to the input image to thereby generate a plurality of modified input images; (b) the CNN device applying convolution operations to each of the modified input images to thereby obtain each of modified feature maps corresponding to each of the modified input images; (c) the CNN device applying each of reverse transform functions, corresponding to each of the modification functions, to each of the corresponding modified feature maps, to thereby generate each of reverse transform feature maps corresponding to each of the modified feature maps; and (d) the CNN device integrating at least part of the reverse transform feature maps to thereby obtain an integrated feature map, and the CNN device using the same.

BACKGROUND OF THE INVENTION

Deep Convolutional Neural Networks (Deep CNNs) are the heart of the remarkable development in the field of deep learning. CNNs have already been used in the 90s to solve the problem of character recognition, but the reason of becoming as famous as it is now is thanks to recent research. The deep CNNs won the ILSVRC-2012 competition. Then, the convolutional neural network became a very useful tool in the field of machine learning.

Image segmentation, on the other hand, takes a training image or a test image as an input and produces a label image as an output. The deep learning has recently become popular. For example, the deep learning is used for the image segmentation.

Meanwhile, various methods for improving a performance of such segmentation are currently presented.

As one of such methods, when performing the segmentation, a user may desire to enhance the accuracy of the segmentation by using several CNNs. Namely, after the same input data is inputted to a plurality of CNN devices, respective outputs of the CNN devices are combined to generate a combined output, but in this case, there may be problems that initial values of parameters of the plurality of CNN devices should be randomly set every time, and in order to obtain a result of the image segmentation, the plurality of CNN devices should be individually learned.

SUMMARY OF THE INVENTION

It is an object of the present invention to solve all the aforementioned problems.

It is another object of the present invention to acquire various information from one input image while using only one convolutional neural network (CNN) device to thereby improve a performance of segmentation.

In accordance with one aspect of the present invention, there is provided a method for providing an integrated feature map by using an ensemble of a plurality of outputs from a convolutional neural network (CNN), including steps of: (a) a CNN device receiving an input image and applying a plurality of modification functions to the input image to thereby generate a plurality of modified input images; (b) the CNN device applying convolution operations to each of the modified input images to thereby obtain each of modified feature maps corresponding to each of the modified input images; (c) the CNN device applying each of reverse transform functions, corresponding to each of the modification functions, to each of the corresponding modified feature maps, to thereby generate each of reverse transform feature maps corresponding to each of the modified feature maps; and (d) the CNN device integrating at least part of the reverse transform feature maps to thereby obtain an integrated feature map.

As one example, the modification function Ti is determined as a function capable of modifying an input image I into n modified input images Ti(I), wherein i is a natural number from 1 to n, and wherein the modification function Ti is determined as a function having its corresponding reverse transform function $T{-1}i(Ti(I))=1$.

As one example, the modification function Ti modifies the input image I by using at least one of affine transform algorithm and thin-plate spline algorithm.

As one example, the respective modification functions use the same modification algorithm which has different detailed parameters.

As one example, the plurality of reverse transform feature maps have each segmentation score for each pixel, and wherein, at the step of (d), the CNN device sums each of segmentation scores of each of pixels of each of the reverse transform feature maps by referring to each of relative locations of each of the pixels of the reverse transform feature maps, to thereby obtain the integrated feature map.

As one example, at the step of (d), the CNN device assigns a label, corresponding to a highest channel among channel values per pixel in the integrated feature map, to its corresponding pixel, to thereby obtain a segmentation output image.

As one example, at the step of (c), the CNN device moves each pixel of the modified feature maps, generated as a result of segmentation of the modified input images, to its corresponding location on a result of segmentation of the input image by using the reverse transform function, to thereby generate the plurality of reverse transform feature maps.

As one example, the method further comprises a step of: (e) the CNN device (i) calculating a loss based on a difference between an output value, obtained by referring to the integrated feature map, and a ground truth (GT) value and (ii) performing backpropagation in order to minimize the loss, to thereby optimize one or more parameters of the CNN device.

In accordance with another aspect of the present invention, there is provided a method for convolutional neural network (CNN)-testing a test image as an input image, including steps of: (a) a test device, on condition that (i) a CNN device has received an input image for training and has applied a plurality of modification functions to the input image for training to thereby generate a plurality of modified input images for training; (ii) the CNN device has applied convolution operations to each of the modified input images for training to thereby obtain each of modified feature maps for training corresponding to each of the modified input images for training; (iii) the CNN device has applied each of reverse transform functions, corresponding to each of the modification functions, to each of the corresponding modified feature maps for training, to thereby generate each of reverse transform feature maps for training corresponding to each of the modified feature maps for training; (iv) the CNN device has integrated at least part of the reverse transform feature maps for training to thereby obtain an integrated feature map; and (v) the CNN device has calculated a loss based on a difference between an output value, obtained by referring to the integrated feature map, and a ground truth (GT) value and has performed backpropagation in order to minimize the loss, to thereby optimize one or more parameters of the CNN device, acquiring an input image for testing, wherein the test device includes the optimized parameters of the CNN device; (b) the test device applying a plurality of modification functions to the input image for testing to thereby generate a plurality of modified input images for testing; (c) the test device applying convolution operations to each of the modified input images for testing to thereby obtain each of modified feature maps for testing corresponding to each of the modified input images for testing; (d) the test device applying each of reverse transform functions, corresponding to each of the modification functions, to each of the corresponding modified feature maps for testing, to thereby generate each of reverse transform feature maps for testing corresponding to each of the modified feature maps for testing; and (e) the test device integrating at least part of the reverse transform feature maps for testing to thereby obtain an integrated feature map for testing.

As one example, the modification function Ti is determined as a function capable of modifying an input image I into n modified input images Ti(I), wherein i is a natural number from 1 to n, and wherein the modification function Ti is determined as a function having its corresponding reverse transform function T−1i(Ti(I))=1.

As one example, the respective modification functions use the same modification algorithm which has different detailed parameters.

As one example, the reverse transform feature maps for training and the reverse transform feature maps for testing have each segmentation score for each pixel, wherein, at the step of (iv), the CNN device sums each of segmentation scores of each of pixels of each of the reverse transform feature maps for training by referring to each of relative locations of each of the pixels of the reverse transform feature maps for training, to thereby obtain the integrated feature map for training, and wherein, at the step of (e), the CNN device sums each of segmentation scores of each of pixels of each of the reverse transform feature maps for testing by referring to each of relative locations of each of the pixels of the reverse transform feature maps for testing, to thereby obtain the integrated feature map for testing.

In accordance with still another aspect of the present invention, there is provided a CNN device for providing an integrated feature map by using an ensemble of a plurality of outputs from a convolutional neural network (CNN), including: a communication part for receiving an input image as a training image; and a processor for performing processes of (1) applying a plurality of modification functions to the input image to thereby generate a plurality of modified input images; (2) applying convolution operations to each of the modified input images to thereby obtain each of modified feature maps corresponding to each of the modified input images; (3) applying each of reverse transform functions, corresponding to each of the modification functions, to each of the corresponding modified feature maps, to thereby generate each of reverse transform feature maps corresponding to each of the modified feature maps; and (4) integrating at least part of the reverse transform feature maps to thereby obtain an integrated feature map.

As one example, the modification function Ti is determined as a function capable of modifying an input image I into n modified input images Ti(I), wherein i is a natural number from 1 to n, and wherein the modification function Ti is determined as a function having its corresponding reverse transform function T−1i(Ti(I))=1.

As one example, the modification function Ti modifies the input image I by using at least one of affine transform algorithm and thin-plate spline algorithm.

As one example, the respective modification functions use the same modification algorithm which has different detailed parameters.

As one example, the plurality of reverse transform feature maps have each segmentation score for each pixel, and wherein, at the process of (4), the processor sums each of segmentation scores of each of pixels of each of the reverse transform feature maps by referring to each of relative locations of each of the pixels of the reverse transform feature maps, to thereby obtain the integrated feature map.

As one example, at the process of (4), the processor assigns a label, corresponding to a highest channel among channel values per pixel in the integrated feature map, to its corresponding pixel, to thereby obtain a segmentation output image.

As one example, at the process of (3), the processor moves each pixel of the modified feature maps, generated as a result of segmentation of the modified input images, to its corresponding location on a result of segmentation of the input image by using the reverse transform function, to thereby generate the plurality of reverse transform feature maps.

As one example, the processor further performs a process of: (5) (i) calculating a loss based on a difference between an output value, obtained by referring to the integrated feature map, and a ground truth (GT) value and (ii) performing backpropagation in order to minimize the loss, to thereby optimize one or more parameters of the CNN device.

In accordance with still yet another aspect of the present invention, there is provided a test device for convolutional neural network (CNN)-testing a test image as an input image, including: a communication part for, on condition that (i) a CNN device has received an input image for training and has applied a plurality of modification functions to the input image for training to thereby generate a plurality of modified input images for training; (ii) the CNN device has applied convolution operations to each of the modified input images for training to thereby obtain each of modified feature maps for training corresponding to each of the modified input images for training; (iii) the CNN device has applied each of reverse transform functions, corresponding to each of the modification functions, to each of the corresponding modified feature maps for training, to thereby generate each of reverse transform feature maps for training corresponding to each of the modified feature maps for training; (iv) the CNN device has integrated at least part of the reverse transform feature maps for training to thereby obtain an integrated feature map; and (v) the CNN device has calculated a loss based on a difference between an output value, obtained by referring to the integrated feature map, and a ground truth (GT) value and has performed backpropagation in order to minimize the loss, to thereby optimize one or more parameters of the CNN device, acquiring the input image for testing, wherein the test device includes the optimized parameters of the CNN device; and a processor for performing processes of (1) applying a plurality of modification functions to the input image for testing to thereby generate a plurality of modified input images for testing; (2) applying convolution operations to each of the modified input images for testing to thereby obtain each of modified feature maps for testing corresponding to each of the modified input images for testing; (3) applying each of reverse transform functions, corresponding to each of the modification functions, to each of the corresponding modified feature maps for testing, to thereby generate each of reverse transform feature maps for testing corresponding to each of the modified feature maps for testing; and (4) integrating at least part of the reverse transform feature maps for testing to thereby obtain an integrated feature map for testing.

As one example, the modification function Ti is determined as a function capable of modifying an input image I into n modified input images Ti(I), wherein i is a natural number from 1 to n, and wherein the modification function Ti is determined as a function having its corresponding reverse transform function T−1i(Ti(I))=1.

As one example, the respective modification functions use the same modification algorithm which has different detailed parameters.

As one example, the reverse transform feature maps for training and the reverse transform feature maps for testing have each segmentation score for each pixel, wherein, at the process of (iv), the processor sums each of segmentation scores of each of pixels of each of the reverse transform feature maps for training by referring to each of relative locations of each of the pixels of the reverse transform feature maps for training, to thereby obtain the integrated feature map for training, and wherein, at the process of (4), the processor sums each of segmentation scores of each of pixels of each of the reverse transform feature maps for testing by referring to each of relative locations of each of the pixels of the reverse transform feature maps for testing, to thereby obtain the integrated feature map for testing.

BRIEF DESCRIPTION OF THE DRAWINGS

The above and other objects and features of the present invention will become apparent from the following description of preferred embodiments given in conjunction with the accompanying drawings, in which:

FIG. 7 is a diagram illustrating the whole process of convolutional neural network (CNN) in accordance with the present invention.

DETAILED DESCRIPTION OF THE PREFERRED EMBODIMENTS

Figure 1:
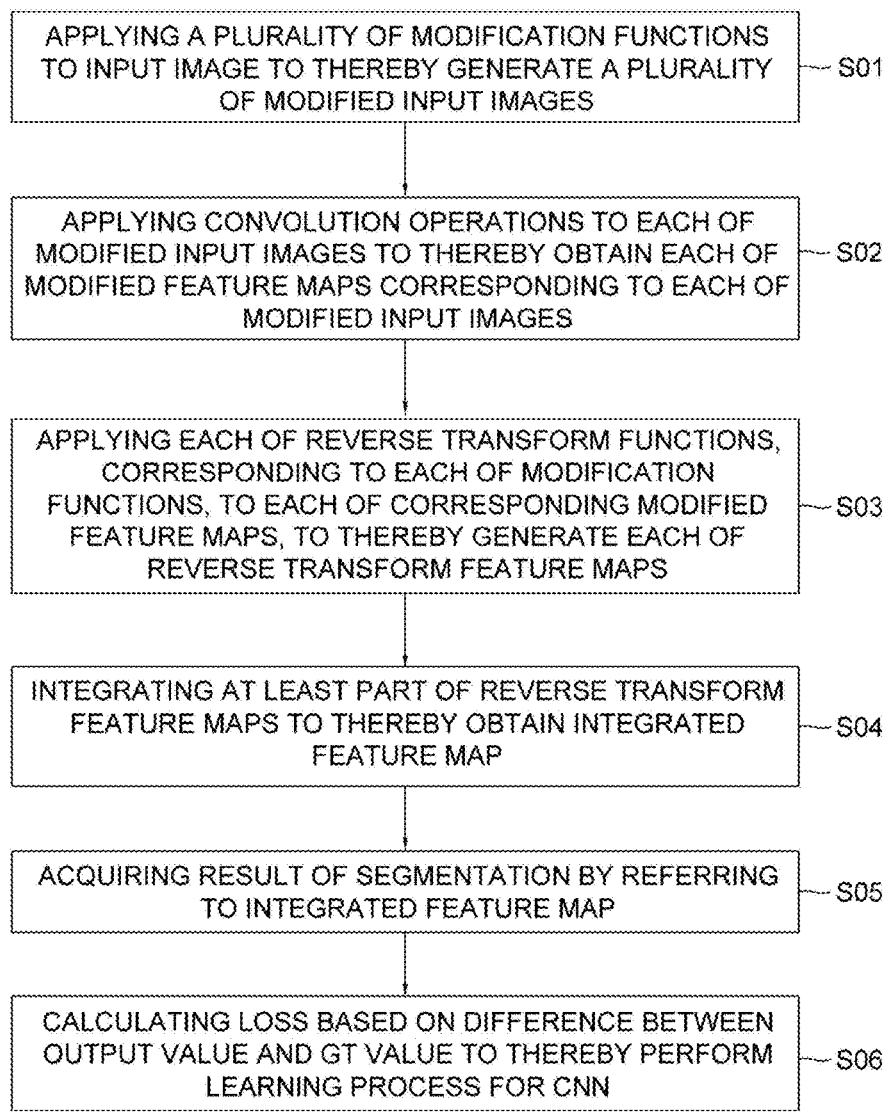
FIG. 1 is a flowchart illustrating a learning method using a plurality of image sets acquired through modification of an input image in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 2:
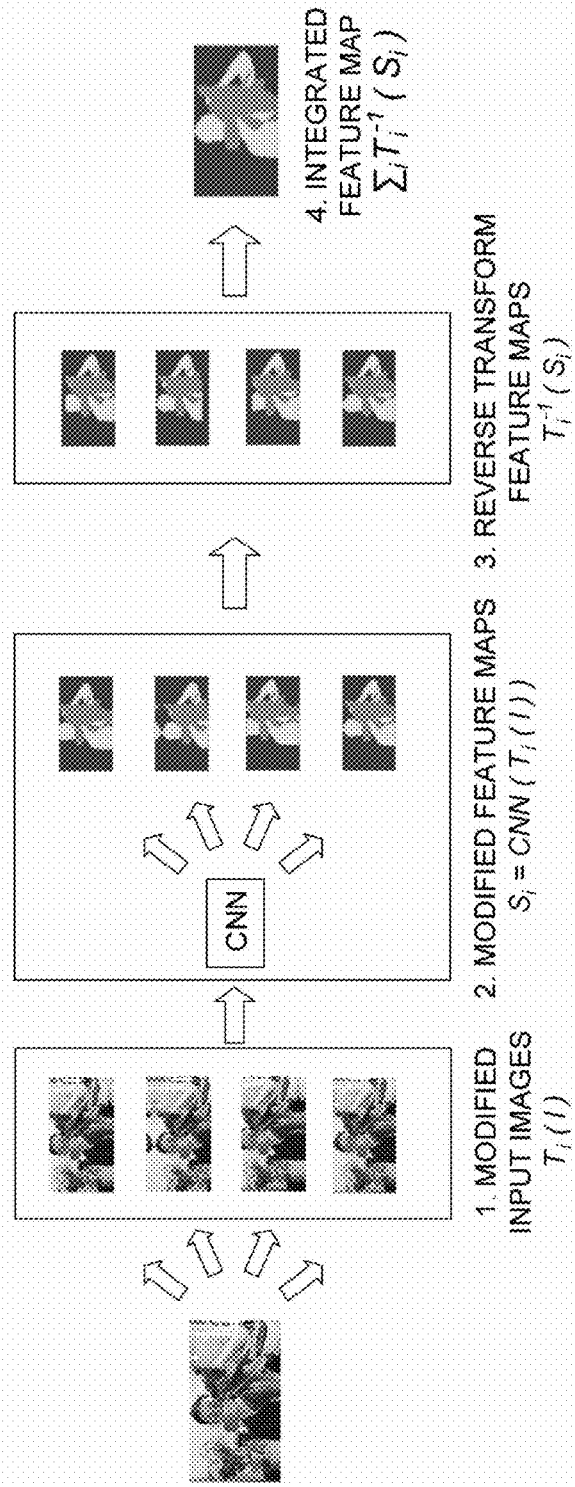
FIG. 2 is a diagram illustrating a process of performing segmentation by using a plurality of image sets acquired through modification of the input image in accordance with the present invention.

FIG. 1 is a flowchart illustrating a learning method using a plurality of image sets acquired through modification of an input image in accordance with the present invention. Further, FIG. 2 is a diagram illustrating a process of performing segmentation by using the plurality of image sets acquired through the modification of the input image in accordance with the present invention. Furthermore, FIGS. 3 to 6 are diagrams illustrating respective steps of the segmentation process illustrated in FIG. 2. In addition, FIG. 7 is a diagram illustrating the whole process of convolutional neural network (CNN) in accordance with the present invention.

By referring to FIG. 1, a CNN learning method in accordance with the present invention includes (i) receiving an input image and applying a plurality of modification functions to the input image to thereby generate a plurality of modified input images at a step of S01, (ii) applying convolution operations to each of the modified input images to thereby obtain each of modified feature maps corresponding to each of the modified input images at a step of S02, (iii) applying each of reverse transform functions, corresponding to each of the modification functions, to each of the corresponding modified feature maps, to thereby generate each of reverse transform feature maps corresponding to each of the modified feature maps at a step of S03, (iv) integrating at least part of the reverse transform feature maps to thereby obtain an integrated feature map at a step of S04, (v) acquiring a result of segmentation by referring to the integrated feature map at a step of S05, and (vi) calculating a loss based on a difference between an output value, i.e., a result of segmentation, and a ground truth (GT) value to thereby perform a learning process for the CNN at step of S06. Here, the step of S06 is not essential but the process of obtaining the result of segmentation through the steps S01 to S05 is an important characteristic of the present invention.

Such a process can be performed in a CNN device. A communication part of the CNN device receives an input image, and a processor of the CNN device performs processes of (1) applying a plurality of modification functions to the input image to thereby generate a plurality of modified input images; (2) applying convolution operations to each of the modified input images to thereby obtain each of modified feature maps corresponding to each of the modified input images; (3) applying each of reverse transform functions, corresponding to each of the modification functions, to each of the corresponding modified feature maps, to thereby generate each of reverse transform feature maps corresponding to each of the modified feature maps; and (4) integrating at least part of the reverse transform feature maps to thereby obtain an integrated feature map.

As another example, a processor of a learning device (not shown) capable of learning the CNN device performs processes of (1) receiving an input image as a training image and applying a plurality of modification functions to the input image for training to thereby generate a plurality of modified input images for training; (2) applying convolution operations to each of the modified input images for training to thereby obtain each of modified feature maps for training corresponding to each of the modified input images for training; (3) applying each of reverse transform functions, corresponding to each of the modification functions, to each of the corresponding modified feature maps for training, to thereby generate each of reverse transform feature maps for training corresponding to each of the modified feature maps for training; and (4) integrating at least part of the reverse transform feature maps for training to thereby obtain an integrated feature map for training, then calculating a loss based on a difference between an output value, e.g., a result of segmentation, and a ground truth (GT) value and performing backpropagation to minimize the loss, to thereby optimize one or more parameters of the CNN device.

As still another example, a CNN testing method in accordance with the present invention uses the CNN device having one or more parameters optimized by the above-described learning method and may perform the above-mentioned steps S01 to S05.

Specifically, according to the CNN testing method of the present invention, on condition that the one or more parameters of the CNN device having been optimized by performing backpropagation to reduce a loss are acquired, if a test device, which includes the optimized parameters of the CNN device, acquires an input image for testing, the test device (i) applies a plurality of modification functions to the input image for testing to thereby generate a plurality of modified input images for testing, (ii) applies convolution operations to each of the modified input images for testing to thereby obtain each of modified feature maps for testing corresponding to each of the modified input images for testing, and (iii) applies each of reverse transform functions, corresponding to each of the modification functions, to each of the corresponding modified feature maps for testing, to thereby generate each of reverse transform feature maps for testing corresponding to each of the modified feature maps for testing. Then the test device integrates at least part of the reverse transform feature maps for testing to thereby obtain an integrated feature map for testing, and obtains a result of segmentation. A communication part of the test device plays a role of receiving the input image for testing and a processor of the test device performs processes as mentioned above.

Hereinafter, the segmentation process by using the CNN and the learning process and the testing process using the same will be specifically described by referring to FIGS. 2 to 7. Herein, the present invention is not limited to the segmentation process, but the integrated feature map can be applied to various cases.

Figure 3:
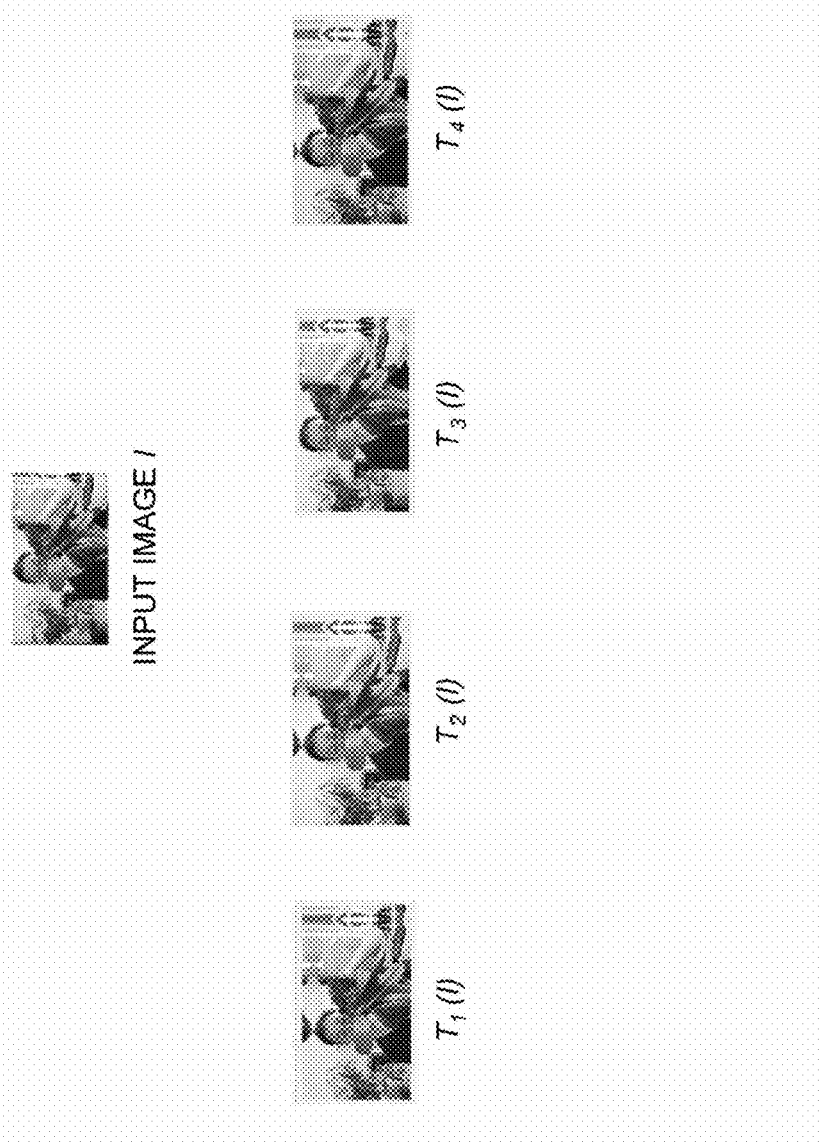
FIGS. 3 to 6 are diagrams illustrating respective steps of the segmentation process illustrated in FIG. 2.

By referring to FIGS. 2 and 3, at the step S01, if the CNN device obtains one input image (or if the test device obtains a test image), the CNN device may apply the plurality of modification functions $T_i$ to the input image I to thereby generate the plurality of modified input images $T_i(I)$. For example, by referring to FIG. 3, it is understood that 4 modified input images $T_i(I)$ have been generated by modifying the input image I by 4 different methods. As such, the modification function $T_i$ is a function which modifies the input image I to n modified input images $T_i(I)$. Herein, i is a natural number from 1 to n, and the modification function $T_i$ is preferably a function having its corresponding reverse transform function $T^{-1}_i$. That is, $T^{-1}_i(T_i(I))=I$.

Herein, the modification function $T_i$ may be a scaling function or a transition function and may be various algorithms such as affine transform algorithm and thin-plate spline interpolation algorithm. In addition, the respective modification functions may use different algorithms but, in another case, the respective modification functions may use the same algorithm with different detailed parameters.

If the modified input images $T_i(I)$ generated through the modification function $T_i$ are compared, it is seen that locations and sizes of respective objects to be segmented are somewhat different.

Figure 4:
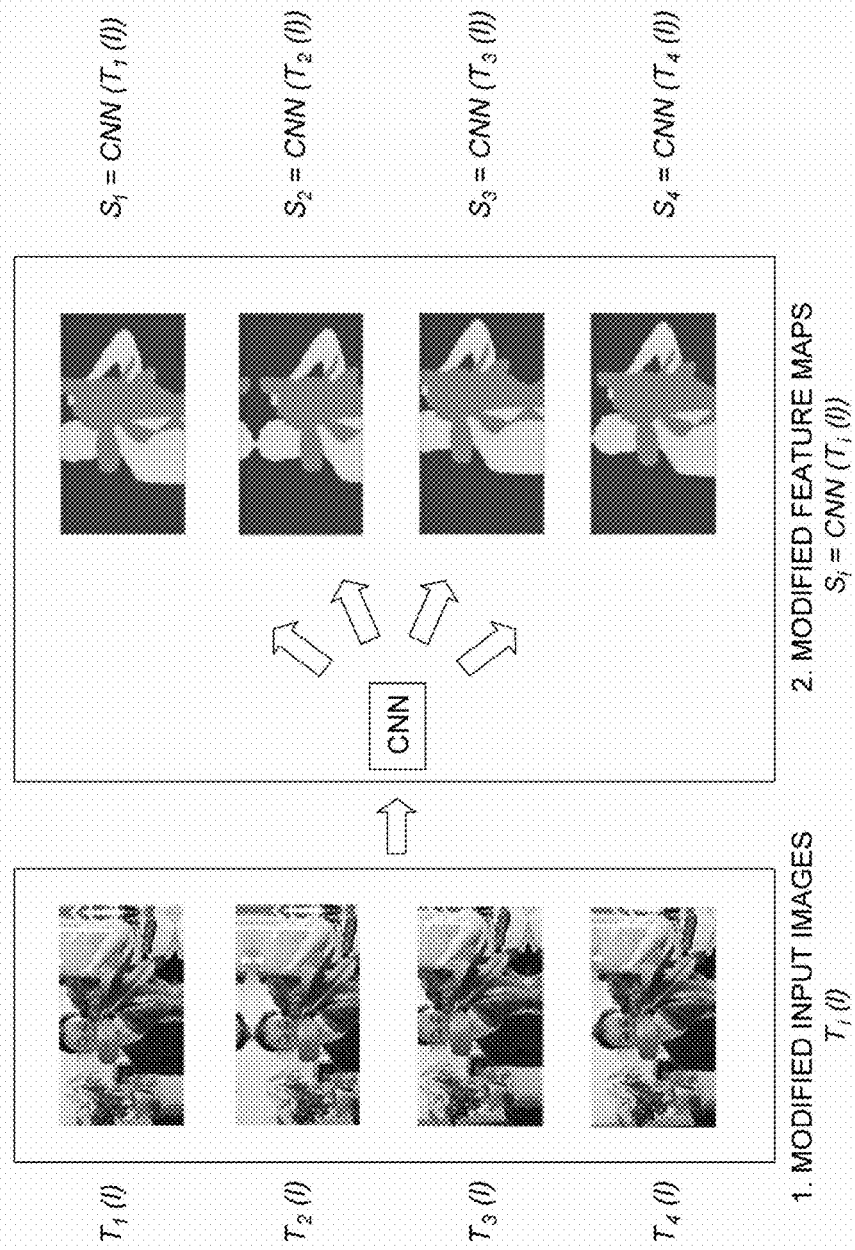

By referring to FIG. 4, at the step S02, the CNN device may apply convolution operations to each of the modified input images $T_i(I)$ to thereby obtain each of modified feature maps $S_i=CNN(T_i(I))$ corresponding to each of the modified input images.

FIG. 7 illustrates a process of generating feature maps through CNN operations.

Hereinafter, the step of S02 will be described in detail. The plurality of modified input images $T_i(I)$ are inputted to the CNN device and thus a plurality of convolution operations are applied to each of the modified input images $T_i(I)$ by using a plurality of convolution filters to thereby generate each of outputs of Conv.K. Thereafter, deconvolution operations are applied to each of the outputs of Conv.K by using a plurality of deconvolution filters to thereby generate each of outputs of Deconv.1, i.e., each of modified feature maps $S_i$. In addition, each result of segmentation is obtained from each of the modified feature maps $S_i$ through additional operations. Herein, the additional operations are not explained in this specification because it is known to those skilled in the art. Meanwhile, FIG. 7 illustrates only one modified input image for the convenience of description, but the present invention should have the plurality of modified input images.

Next, the segmentation process is performed after the step S03 and the step S04. Herein, a structure of CNN capable of encoding an image with at least one convolution operation to thereby obtain a feature map and then decoding the feature map to thereby obtain a segmentation image is called an encoding-decoding network or a U-Net. Whenever each convolution operation is applied in the encoding process, the size of the input image is reduced to, for example, ½, but this is for reducing the amount of operations by reduction of the image size. Furthermore, the number of channels of the image inputted through the convolution filter increases in the encoding process, but this is for obtaining a complicated pattern through the increased channels while utilizing an advantage of the reduction in the amount of operations. For example, whenever each convolution filtering is performed in the encoding process, if the image size is reduced to ½ and the number of channels increases to a double, high frequency portions in the size-reduced feature maps is reduced so that the feature maps may have mostly information on low frequency portions. Herein, such low frequency portions mean meaningful parts of the image, e.g., the sky, roads, buildings, automobiles, etc. The result of segmentation of such meaningful parts is obtained through the feature maps outputted through the deconvolution operation, that is, the decoding operation.

Figure 5:
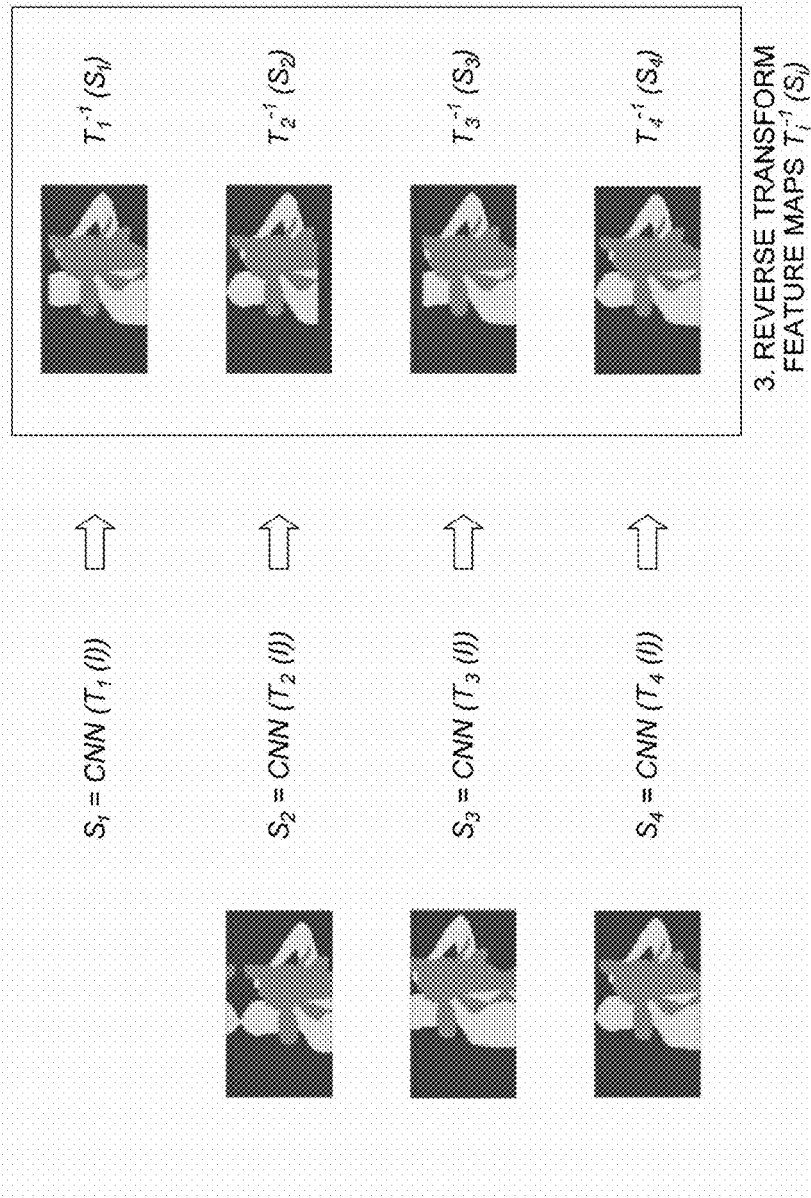

Next, by referring to FIG. 5, at the step S03, the CNN device may apply each of the reverse transform functions $T^{-1}_i$, corresponding to each of the modification functions, to each of the corresponding modified feature maps $S_i$, to thereby generate each of the reverse transform feature maps $T^{-1}{}_i(S_i)$ corresponding to each of the modified feature maps. Herein, each of the reverse feature maps $T^{-1}{}_i(S_i)$ has each segmentation score for each pixel. This step is a process of moving each pixel of the modified feature maps $S_i$, generated as a result of segmentation of the modified input images $T_i(I)$, to its corresponding location on the result of segmentation of the input image I by using the reverse transform function $T^{-1}{}_i$, to thereby generate the plurality of reverse transform feature maps $T^{-1}{}_i(S_i)$. Namely, in a state that a location of a pixel of an object in the input image is (x, y), if the transform function $T_i$ is applied the location (x, y) to thereby acquire a changed location (x', y'), its corresponding location of the pixel in the modified feature map $S_i$ is also a particular location corresponding to (x', y'). Then, the CNN device applies the reverse transform function $T^{-1}{}_i$ to the particular location to move the location of its corresponding pixel back to (x, y).

Figure 6:
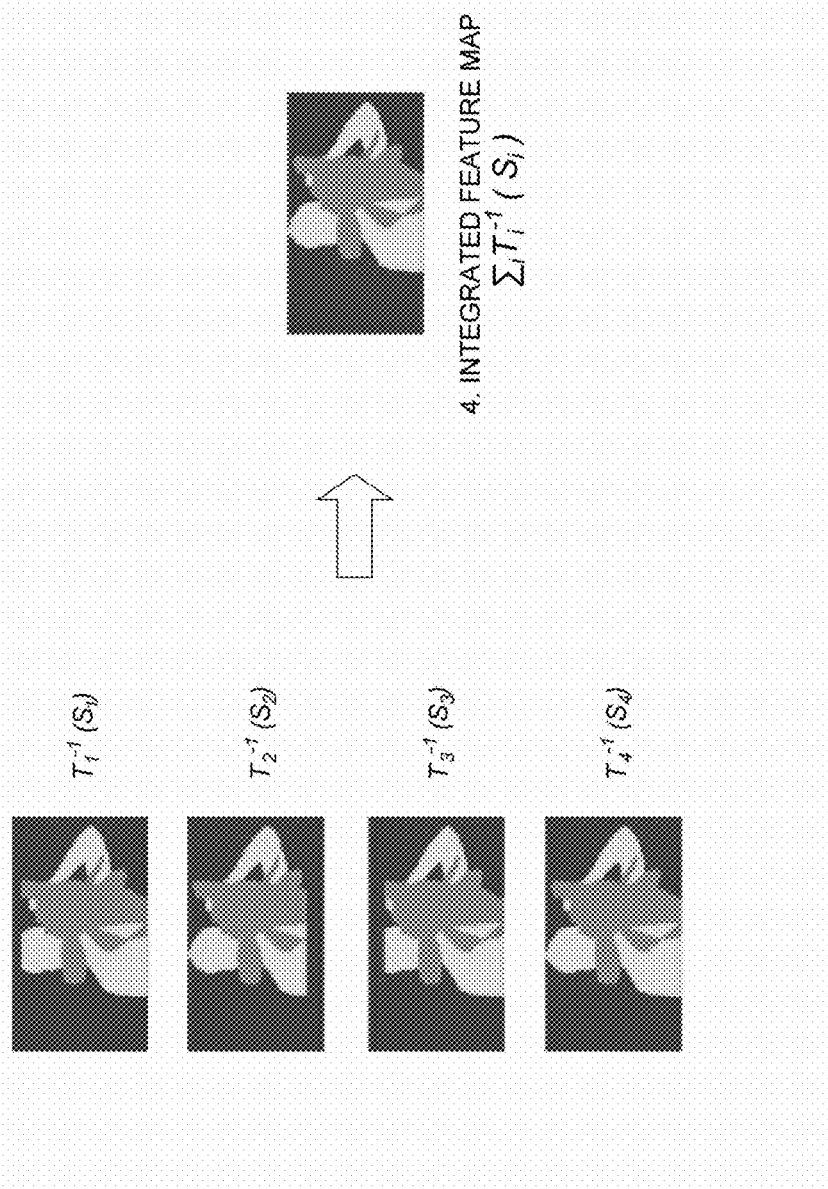

At the step S04, at least part of the reverse transform feature maps $T^{-1}{}_i(S_i)$ may be integrated to thereby obtain the integrated feature map, as shown in FIG. 6. For example, at this step, an operation of summing up each score of each of the pixels of each of the reverse transform feature maps $T^{-1}{}_i(S_i)$ is performed, which may be expressed as the following equation.

$$\sum_i T_i^{-1}(S_i) \qquad \text{[Equation 1]}$$

Furthermore, at this step, an average value of each of the scores of each pixel of each of the reverse transform feature maps $T^{-1}{}_i(S_i)$ may be obtained. In another case, a median value of each of the scores of each pixel may be obtained. In still another case, the maximum value of each of the scores of each pixel may be obtained. Herein, the median value means (n/2)-th value among n values.

Through such a process, the CNN device can add each of the scores of each of the pixels corresponding to each of the reverse transform feature maps by referring to each of relative locations of each of the pixels of the reverse transform feature maps.

Herein, a label, corresponding to a highest channel value among channel values per pixel in the integrated feature map, may be assigned to its corresponding pixel, to thereby obtain a segmentation label. Namely, at the step of S04, a segmentation score map is obtained for each image by integrating the feature maps, and the segmentation score map includes channels corresponding to classes intended to be obtained (e.g., if there are N classes, the segmentation score map may include N+1 channels, i.e., N channels corresponding to respective classes and one channel corresponding to the background), and a label corresponding to a specific channel having the highest value among the N+1 channels for each pixel is assigned to its corresponding pixel to thereby generate the segmentation output image. Further, a plurality of linear or non-linear operations required to obtain the segmentation output image can be further performed.

Additionally, at the step S06, the CNN device calculates the loss based on the difference between the output value, i.e., the segmentation result, obtained by referring to the integrated feature map, and the ground truth (GT) value and performs backpropagation to minimize the loss, thereby optimizing one or more parameters of the CNN device. By referring to FIG. 7, the CNN device acquires an input image as a training image to calculate the loss between the obtained segmentation image and the GT image in the learning process. Then the parameters of the CNN device are optimized through the backpropagation process.

In accordance with the present invention, by using only one CNN device, if one image is modified to acquire many modified input images and results from the modified input images are combined, many feature maps can be obtained and thus various results can be obtained from one input image. As such, the performance of the CNN device such as the performance of segmentation of the CNN device can be improved. For example, when input image A is used, a segmentation result may be good, but when input image A' is used, a segmentation result may not be good. That is, when different input images are used, segmentation results may be somewhat different. Thus, if an integrated feature map is obtained by considering a plurality of a little different images, a more accurate segmentation result can be obtained.

Such a process may be applied in the same manner in the actual testing process after the CNN learning process. As described above, the test device (i) applies a plurality of modification functions to an input image for testing to thereby generate a plurality of modified input images for testing, (ii) applies convolution operations to each of the modified input images for testing to thereby obtain each of modified feature maps for testing corresponding to each of the modified input images for testing, (iii) applies each of reverse transform functions, corresponding to each of the modification functions, to each of the corresponding modified feature maps for testing, to thereby generate each of reverse transform feature maps for testing corresponding to each of the modified feature maps for testing, and (iv) integrates at least part of the reverse transform feature maps for testing to thereby obtain an integrated feature map for testing. Herein, if a result of segmentation is obtained after obtaining the integrated feature map for testing, a more accurate result of segmentation can be obtained.

It would be understood by those skilled in the art that (i) transmission/reception of the above-described image data such as the training image and the testing image can be performed by the communication part of the CNN device, the learning device, and the testing device, (ii) various feature maps and their corresponding data may be held/maintained by the processor (and/or memory) of the CNN device, the learning device and the testing device, and (iii) the process of convolution operation, the deconvolution operation and the operation of acquiring loss value may be mainly performed by the processor of the CNN device, the learning device and the testing device, but the present invention is not limited to these examples.

The present invention has an effect of obtaining many different feature maps from one input image while using only one CNN device, only one learning device or only one testing device.

The present invention has another effect of obtaining and integrating various results from one input image to thereby implement a high performance of the CNN device, the learning device or the testing device.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for providing an integrated feature map by using an ensemble of a plurality of outputs from a convolutional neural network (CNN) to isolate objects in an input image, comprising steps of:
    (a) a CNN device receiving the input image and applying a plurality of modification functions to the input image to thereby generate a plurality of modified input images;
    (b) the CNN device applying convolution operations to each of the modified input images to thereby obtain each of modified feature maps corresponding to each of the modified input images;
    (c) the CNN device applying each of reverse transform functions, corresponding to each of the modification functions, to each of the corresponding modified feature maps, to thereby generate each of reverse transform feature maps corresponding to each of the modified feature maps; and
    (d) the CNN device integrating at least part of the reverse transform feature maps to thereby obtain an integrated feature map, and assigning a label, corresponding to a highest channel among channel values per pixel in the integrated feature map, to its corresponding pixel, to thereby obtain a segmentation output image to isolate the objects in the input image.

2. The method of claim 1, wherein a modification function $T_i$ in the modification functions is determined as a function that modifies an input image I into n modified input images $T_i(I)$,
    wherein i is a natural number from 1 to n, and
    wherein the modification function $T_i$ is determined as a function having its corresponding reverse transform function $T^{-1}_i(I))=1$.

3. The method of claim 2, wherein the modification function $T_i$ modifies the input image I by using at least one of affine transform algorithm and thin-plate spline algorithm.

4. The method of claim 2, wherein the respective modification functions use the same modification algorithm which has different detailed parameters.

5. The method of claim 1, wherein the plurality of reverse transform feature maps have each segmentation score for each pixel, and
    wherein, at the step of (d), the CNN device sums each of segmentation scores of each of pixels of each of the reverse transform feature maps by referring to each of relative locations of each of the pixels of the reverse transform feature maps, to thereby obtain the integrated feature map.

6. The method of claim 5, wherein, at the step of (c), the CNN device moves each pixel of the modified feature maps, generated as a result of segmentation of the modified input images, to its corresponding location on a result of segmentation of the input image by using the reverse transform function, to thereby generate the plurality of reverse transform feature maps.

7. The method of claim 1, further comprising a step of:
    (e) the CNN device (i) calculating a loss based on a difference between an output value, obtained by referring to the integrated feature map, and a ground truth (GT) value and (ii) performing backpropagation in order to minimize the loss, to thereby optimize one or more parameters of the CNN device.

8. The method of claim 1, wherein objects in the image include at least one of sky, a road, a building, an automobile, a background, and a person.

9. A method for convolutional neural network (CNN)-testing a test image as an input image to isolate objects in the input image, comprising steps of:
    (a) a test device, on condition that (i) a CNN device has received the input image for training and has applied a plurality of modification functions to the input image for training to thereby generate a plurality of modified input images for training; (ii) the CNN device has applied convolution operations to each of the modified input images for training to thereby obtain each of modified feature maps for training corresponding to each of the modified input images for training; (iii) the CNN device has applied each of reverse transform functions, corresponding to each of the modification functions, to each of the corresponding modified feature maps for training, to thereby generate each of reverse transform feature maps for training corresponding to each of the modified feature maps for training; (iv) the CNN device has integrated at least part of the reverse transform feature maps for training to thereby obtain an integrated feature map, and assigned a label, corresponding to a highest channel among channel values per pixel in the integrated feature map, to its corresponding pixel, to thereby obtain a segmentation output image to isolate the objects in the input image; and (v) the CNN device has calculated a loss based on a difference between an output value, obtained by referring to the integrated feature map, and a ground truth (GT) value and has performed backpropagation in order to minimize the loss, to thereby optimize one or more parameters of the CNN device, acquiring an input image for testing, wherein the test device includes the optimized parameters of the CNN device;

(b) the test device applying a plurality of modification functions to the input image for testing to thereby generate a plurality of modified input images for testing;

(c) the test device applying convolution operations to each of the modified input images for testing to thereby obtain each of modified feature maps for testing corresponding to each of the modified input images for testing;

(d) the test device applying each of reverse transform functions, corresponding to each of the modification functions, to each of the corresponding modified feature maps for testing, to thereby generate each of reverse transform feature maps for testing corresponding to each of the modified feature maps for testing; and (e) the test device integrating at least part of the reverse transform feature maps for testing to thereby obtain an integrated feature map for testing.

10. The method of claim 9, wherein a modification function $T_i$ in the modification functions is determined as a function that modifies an input image I into n modified input images $T_i(I)$, wherein i is a natural number from 1 to n, and wherein the modification function $T_i$ is determined as a function having its corresponding reverse transform function $T^{-1}_i(T_i(I))=1$.

11. The method of claim 10, wherein the respective modification functions use the same modification algorithm which has different detailed parameters.

12. The method of claim 9, wherein the reverse transform feature maps for training and the reverse transform feature maps for testing have each segmentation score for each pixel, wherein, at the step of (iv), the CNN device sums each of segmentation scores of each of pixels of each of the reverse transform feature maps for training by referring to each of relative locations of each of the pixels of the reverse transform feature maps for training, to thereby obtain the integrated feature map for training, and wherein, at the step of (e), the CNN device sums each of segmentation scores of each of pixels of each of the reverse transform feature maps for testing by referring to each of relative locations of each of the pixels of the reverse transform feature maps for testing, to thereby obtain the integrated feature map for testing.

13. The method of claim 9, wherein objects in the image include at least one of sky, a road, a building, an automobile, a background, and a person.

14. A CNN device for providing an integrated feature map by using an ensemble of a plurality of outputs from a convolutional neural network (CNN) to isolate objects in an input image, comprising:

a receiving circuit that receives the input image as a training image; and a processor for performing processes of (1) applying a plurality of modification functions to the input image to thereby generate a plurality of modified input images; (2) applying convolution operations to each of the modified input images to thereby obtain each of modified feature maps corresponding to each of the modified input images; (3) applying each of reverse transform functions, corresponding to each of the modification functions, to each of the corresponding modified feature maps, to thereby generate each of reverse transform feature maps corresponding to each of the modified feature maps; and (4) integrating at least part of the reverse transform feature maps to thereby obtain an integrated feature map, and assigning a label, corresponding to a highest channel among channel values per pixel in the integrated feature map, to its corresponding pixel, to thereby obtain a segmentation output image to isolate the objects in the input image.

15. The CNN device of claim 14, wherein the modification function $T_i$ in the modification functions is determined as a function that modifies an input image I into n modified input images $T_i(I)$, wherein i is a natural number from 1 to n, and wherein the modification function $T_i$ is determined as a function having its corresponding reverse transform function $T^{-1}_i(T_i(I))=1$.

16. The CNN device of claim 15, wherein the modification function $T_i$ modifies the input image I by using at least one of affine transform algorithm and thin-plate spline algorithm.

17. The CNN device of claim 15, wherein the respective modification functions use the same modification algorithm which has different detailed parameters.

18. The CNN device of claim 14, wherein the plurality of reverse transform feature maps have each segmentation score for each pixel, and wherein, at the process of (4), the processor sums each of segmentation scores of each of pixels of each of the reverse transform feature maps by referring to each of relative locations of each of the pixels of the reverse transform feature maps, to thereby obtain the integrated feature map.

19. The CNN device of claim 18, wherein, at the process of (3), the processor moves each pixel of the modified feature maps, generated as a result of segmentation of the modified input images, to its corresponding location on a result of segmentation of the input image by using the reverse transform function, to thereby generate the plurality of reverse transform feature maps.

20. The CNN device of claim 14, wherein the processor further performs a process of:

(5) (i) calculating a loss based on a difference between an output value, obtained by referring to the integrated feature map, and a ground truth (GT) value and (ii) performing backpropagation in order to minimize the loss, to thereby optimize one or more parameters of the CNN device.

21. The CNN device of claim 14, wherein objects in the image include at least one of sky, a road, a building, an automobile, a background, and a person.

22. A test device for convolutional neural network (CNN)-testing a test image as an input image to isolate objects in the input image, the test device comprising:

a receiving circuit that acquires the input image for testing on condition that (i) a CNN device has received the input image for training and has applied a plurality of modification functions to the input image for training to thereby generate a plurality of modified input images for training; (ii) the CNN device has applied convolution operations to each of the modified input images for training to thereby obtain each of modified feature maps for training corresponding to each of the modified input images for training; (iii) the CNN device has applied each of reverse transform functions, corresponding to each of the modification functions, to each of the corresponding modified feature maps for training, to thereby generate each of reverse transform feature maps for training corresponding to each of the modified feature maps for training; (iv) the CNN device has integrated at least part of the reverse transform feature maps for training to thereby obtain an integrated feature map, and assigned a label, corresponding to a highest channel among channel values per pixel in the integrated feature map, to its corresponding pixel, to thereby obtain a segmentation output image to isolate the objects in the input image; and (v) the CNN device has calculated a loss based on a difference between an output value, obtained by referring to the integrated feature map, and a ground truth (GT) value and has performed backpropagation in order to minimize the loss, to thereby optimize one or more parameters of the CNN device, wherein the test device includes the optimized parameters of the CNN device; and a processor for performing processes of (1) applying a plurality of modification functions to the input image for testing to thereby generate a plurality of modified input images for testing; (2) applying convolution operations to each of the modified input images for testing to thereby obtain each of modified feature maps for testing corresponding to each of the modified input images for testing; (3) applying each of reverse transform functions, corresponding to each of the modification functions, to each of the corresponding modified feature maps for testing, to thereby generate each of reverse transform feature maps for testing corresponding to each of the modified feature maps for testing; and (4) integrating at least part of the reverse transform feature maps for testing to thereby obtain an integrated feature map for testing.

23. The test device of claim 22, wherein a modification function $T_i$ in the modification functions is determined as a function that modifies an input image I into n modified input images $T_i(I)$, wherein i is a natural number from 1 to n, and wherein the modification function $T_i$ is determined as a function having its corresponding reverse transform function $T^{-1}_i(T_i(I))=1$.

24. The test device of claim 23, wherein the respective modification functions use the same modification algorithm which has different detailed parameters.

25. The test device of claim 22, wherein the reverse transform feature maps for training and the reverse transform feature maps for testing have each segmentation score for each pixel, wherein, at the process of (iv), the processor sums each of segmentation scores of each of pixels of each of the reverse transform feature maps for training by referring to each of relative locations of each of the pixels of the reverse transform feature maps for training, to thereby obtain the integrated feature map for training, and wherein, at the process of (4), the processor sums each of segmentation scores of each of pixels of each of the reverse transform feature maps for testing by referring to each of relative locations of each of the pixels of the reverse transform feature maps for testing, to thereby obtain the integrated feature map for testing.

26. The test device of claim 22, wherein objects in the image include at least one of sky, a road, a building, an automobile, a background, and a person.

* * * * *